(12) United States Patent
Ichihara et al.

(10) Patent No.: US 11,926,182 B2
(45) Date of Patent: Mar. 12, 2024

(54) AIRCRAFT PNEUMATIC TIRE

(71) Applicant: BRIDGESTONE CORPORATION, Tokyo (JP)

(72) Inventors: Eiji Ichihara, Tokyo (JP); Yusuke Nakamura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 199 days.

(21) Appl. No.: 17/416,825

(22) PCT Filed: Dec. 14, 2019

(86) PCT No.: PCT/JP2019/049071
§ 371 (c)(1),
(2) Date: Jun. 21, 2021

(87) PCT Pub. No.: WO2020/129869
PCT Pub. Date: Jun. 25, 2020

(65) Prior Publication Data
US 2022/0063339 A1 Mar. 3, 2022

(30) Foreign Application Priority Data
Dec. 21, 2018 (JP) .................... 2018-239331

(51) Int. Cl.
*B60C 9/28* (2006.01)
*B60C 9/00* (2006.01)
(Continued)

(52) U.S. Cl.
CPC .............. *B60C 9/28* (2013.01); *B60C 9/0042* (2013.01); *B60C 9/22* (2013.01); *B60C 9/2204* (2013.01); *B60C 9/263* (2013.01); *B60C 2200/02* (2013.01)

(58) Field of Classification Search
CPC .................. B60C 2200/02; B60C 9/28; B60C 2009/2219; B60C 9/263; B60C 9/22;
(Continued)

(56) References Cited

U.S. PATENT DOCUMENTS 3,921,692 A * 11/1975 Oyoun ...................... B60C 9/30
152/530
4,924,927 A   5/1990 Kawabata et al.
(Continued)

FOREIGN PATENT DOCUMENTS

CN    101172450 A    5/2008
CN    101445023 A    6/2009
(Continued)

OTHER PUBLICATIONS

Office Action dated Aug. 3, 2022, issued in Chinese Application No. 201980084929.8.
(Continued)

*Primary Examiner* — Cedrick S Williams
*Assistant Examiner* — Thomas Frank Schneider
(74) *Attorney, Agent, or Firm* — Sughrue Mion, PLLC

(57) ABSTRACT

A first belt cord made of organic fibers of a spirally wound belt layer extends at an angle of equal to or less than 5° relative to a tire equatorial plane, a second belt cord made of organic fibers of a zigzag belt layer extends at an inclination of an angle of 2° to 45° relative to the tire equatorial plane, to folding back points where the second belt cord is folded back at each width directional end edge of the zigzag belt layer, and a relation of $N_{95} > N_{50}$ is satisfied. $N_{50}$ is the number of stacked belt layers of the spirally wound belt layers, at 50% of half the length of a maximum belt width of belt layers from the tire equatorial plane. $N_{95}$ is the number of stacked belt layers of the spirally wound belt layers, at 95% of half the length of the maximum belt.

3 Claims, 6 Drawing Sheets

(51) Int. Cl.
*B60C 9/22* (2006.01)
*B60C 9/26* (2006.01)

(58) Field of Classification Search
CPC ... B60C 9/2204; B60C 9/26; B60C 2009/266; B29D 30/1621; B29D 30/1628; B29D 30/3021

See application file for complete search history.

(56) References Cited

U.S. PATENT DOCUMENTS

| | | | |
|---|---|---|---|
| 7,360,571 | B2 | 4/2008 | Ueyoko et al. |
| 2008/0105352 | A1 | 5/2008 | Ueyoko et al. |
| 2009/0133796 | A1* | 5/2009 | Harding ................ B29D 30/54 152/532 |
| 2010/0000651 | A1* | 1/2010 | Togou .................... B60C 9/263 152/533 |

FOREIGN PATENT DOCUMENTS

| | | |
|---|---|---|
| CN | 102275466 A | 12/2011 |
| CN | 105829130 A | 8/2016 |
| EP | 2 394 822 A1 | 12/2011 |
| JP | 62-203803 A | 9/1987 |
| JP | 1-109108 A | 4/1989 |
| JP | 3-5503 U | 1/1991 |
| JP | 4-15106 A | 1/1992 |
| JP | H08230410 * | 2/1996 |
| JP | 2002-211208 A | 7/2002 |
| JP | 2005-088590 A | 4/2005 |
| JP | 2007-137119 A | 6/2007 |
| JP | 2008-114841 A | 5/2008 |
| JP | 2012-171423 A | 9/2012 |
| JP | 2016-120831 A | 7/2016 |
| JP | 5961349 B | 8/2016 |
| JP | 2018-079712 A | 5/2018 |

OTHER PUBLICATIONS

Extended European Search Report dated Aug. 5, 2022, issued in European Application No. 19898440.3.
Chinese Office Action dated Mar. 28, 2023 in Chinese Application No. 201980084929.8.
International Search Report for PCT/JP2019/049071 dated, Mar. 17, 2020 (PCT/ISA/210).
International Preliminary Report on Patentability with translation of Written opinion dated Jun. 16, 2021, in International Application No. PCT/JP2019049071.

* cited by examiner

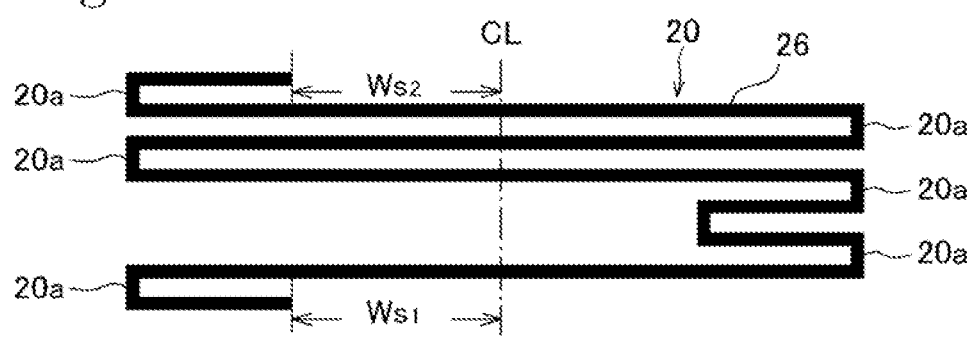

AIRCRAFT PNEUMATIC TIRE

CROSS REFERENCE TO RELATED APPLICATIONS

This application is a National Stage of International Application No. PCT/JP2019/049071 filed Dec. 14, 2019, claiming priority based on Japanese Patent Application No. 2018-239331 filed Dec. 21, 2018.

TECHNICAL FIELD

The present invention relates to an aircraft pneumatic tire.

BACKGROUND ART

In recent years, due to increasing environment consciousness, a reduction in fuel consumption of aircrafts has keenly been demanded. For the reduction in fuel consumption of the aircraft, a reduction in weight of the tires is very effective. A belt layer provided in a circumferential direction of a tread section for reinforcing the tread section of an aircraft tire is produced by stacking multiple belts including organic fibers, and a reduction in the number of the stacked belt layers is very effective for a reduction in the weight of the tire.

As a conventional aircraft pneumatic tire aimed at a reduction in weight, there has been known one in which the number of stacked belt layers is gradually decreased in going from a tire central region toward tire side part regions in the width direction of the tire (see Patent Document 1).

However, a decrease in the number of stacked belt layers leads to lowering in rigidity of the belt but an increase in tensile/compressive strain generated in the belt cord. Repeated taking off and landing of an aircraft would lead to accumulation of fatigue caused by tensile/compressive strain in the belt cord, resulting in lowered strength of the belt cord. Particularly, high compressive/tensile strain is generated in end portions in the width direction of the belt at the tire side part regions, leading to large lowering in the strength of the belt cord and causing influence on durability of the tire.

The side part regions of the tire are shorter in circumferential length of belt as compared to the central region of the tire, but, in the region to be grounded, the belt is extended such as to be approximately equal in diameter to the tire central region, and a large tensile strain is generated there. As a reaction to this, the belt is compressed before and after grounding. In addition, during high-speed running of the tires at the times of taking off and landing of an aircraft, a high centrifugal force is exerted on a side wall section, and the centrifugal force on the side wall section is received by the tire side part regions of the belt, so that high tensile input is generated in the tire side part regions of the belt.

As described above, there is a challenge of satisfying both a reduction in weight of the tire and enhancement of durability of the tire through enhancement of fatigue resistance performance of the belt cord, particularly enhancement of fatigue resistance performance at width directional end portions of the belt.

PRIOR ART DOCUMENT

Patent Document

Patent Document 1: JP 5961349 B

SUMMARY OF THE INVENTION

Underlying Problem to be Solved by the Invention

It is an object of the present invention to realize both a reduction in weight of an aircraft pneumatic tire and enhancement of durability of the tire through enhancement of fatigue resistance performance of a belt.

Means to Solve the Problem

In order to achieve the above object, the present invention is an aircraft pneumatic tire including
a pair of bead cores,
a radial carcass including at least one carcass ply extending toroidally between both the bead cores, and
a belt layer that is disposed on an outer circumferential side of a crown region of the radial carcass and reinforces the radial carcass,
in which the belt layer includes
a spirally wound belt layer in which a ribbon-shaped first strip material with a first belt cord including organic fibers and being covered with rubber has a spirally wound structure and a prescribed plurality of layers are laid on one another, and
a zigzag belt layer in which a ribbon-shaped second strip material with a second belt cord including organic fibers and being covered with rubber has a structure of being wound and extending in a circumferential direction while bending zigzag by being folded back at width directional end edges to an outer circumferential side of the spirally wound belt layer,
the first belt cord of the spirally wound belt layer extends at an angle of equal to or less than 5° relative to a tire equatorial plane,
the second belt cord of the zigzag belt layer extends at an inclination of an angle of 2° to 45° relative to the tire equatorial plane, to folding back points where the second belt cord is folded back at each width directional end edge of the zigzag belt layer, and
a relation of $$N_{95} > N_{50}$$

is satisfied,
where $N_{50}$ is the number of stacked belt layers of the spirally wound belt layer at a distance of 50% of half the length of a maximum belt width of the belt layers from the tire equatorial plane, and
$N_{95}$ is the number of stacked belt layers of the spirally wound belt layer at a distance of 95% of half the length of the maximum belt width from the tire equatorial plane.

The present invention is configured as described above, and the relation of $N_{95} > N_{50}$ is satisfied, where $N_{50}$ is the number of stacked belt layers of the spirally wound belt layers at a distance of 50% of half the length of the maximum belt width of the belt layers from the tire equatorial plane and $N_{95}$ is the number of stacked belt layers of the spirally wound belt layers at a distance of 95% of half the length of the maximum belt width from the tire equatorial plane.

Since the number of stacked belt layers is larger in the tire side part regions farther from the tire equatorial plane at the distance of 95% of half the length of the maximum belt width Wb from the tire equatorial plane than in the tire central region nearer to the tire equatorial plane at the distance of 50% of half the length of the maximum belt width Wb of the belt layers from the tire equatorial plane. Thus, by reducing the number of stacked layers of the belt layers in the tire central region, a reduction in weight of the tire as a whole can be realized. In addition, by increasing the number of stacked layers of the belt layers in the tire side part regions, tensile/compressive strain in the tire side part regions of the belt can be restrained, fatigue of the belt cord can be reduced, the fatigue resistance performance of the belt can be enhanced, and durability of the tire as a whole can be enhanced.

In the abovementioned configuration, $N_{95}$ and $N_{50}$ may be set such that the relation of $$N_{95}=N_{50}+1$$

is satisfied.

Of the spirally wound belt layers, the number of stacked belt layers is greater by one in the tire side part region farther from the tire equatorial plane at the distance of 95% of half the length of the belt maximum width from the tire equatorial plane than in the tire central region nearer to the tire equatorial plane at the distance of 50% of half the length of the belt maximum width from the tire equatorial plane. Thus, by decreasing the number of stacked layers of the belt layers in the tire central region, a reduction in weight of the tire as a whole can be realized. In addition, by increasing the number of stacked layers of the belt layers in the tire side part regions, tensile/compressive strain in the tire side part regions of the belt layer can be restrained, fatigue of the belt cord can be reduced, fatigue resistance performance thereof can be enhanced, and durability of the tire as a whole can be enhanced. Further, since the number of stacked layers of the belt layers is set greater by one in the tire side part regions than in the tire central region, it becomes easy to continuously wind the first strip material spirally.

In the abovementioned configuration, an innermost side layer located on the most inner side in the tire radial direction, of the plurality of spirally wound belt layers, may be disposed on one side of the tire equatorial plane in the tire width direction, the inner end portion on an inner side in the tire width direction, of end portions of the innermost side layer in the tire width direction, may be located with a predetermined spacing $Ws_1$ from the tire equatorial plane, the outer end portion on an outer side in the tire width direction, of the end portions of the innermost side layer, may be located on a tire width directionally outer side than the inner end portion of the innermost side layer, an outermost side layer located on the most outer side in the tire radial direction, of the plurality of spirally wound belt layers, may be disposed on one side or the other side relative to the tire equatorial plane in the tire width direction, the inner end portion on an inner side in the tire width direction, of the end portions of the outermost side layer in the tire width direction, may be located with a predetermined spacing $Ws_2$ from the tire equatorial plane, and the outer end portion on an outer side in the tire width direction, of the end portions of the outermost side layer, may be located on a tire width directionally outer side than the inner end portion of the outermost side layer.

According to this configuration, by decreasing the number of layers of the belt layers in the tire central region of the spirally wound belt layers, a reduction in weight of the tire is realized. In addition, by increasing the number of belt layers in the tire side regions of the spirally wound belt layers as compared to that in the tire central region, fatigue of the belt cord can be reduced, fatigue resistance performance of the belt can be enhanced, and durability of the tire as a whole can be enhanced.

The maximum belt width Wb of the belt layers, Ws1 and Ws2 may be set such that the relations of $$0.7 \le Ws_1/(Wb/2) \le 0.9, \text{ and}$$

$$0.7 \le Ws_2/(Wb/2) \le 0.9$$

are satisfied.

According to the abovementioned configuration, by decreasing the number of stacked layers of the spirally wound layers in a wide range in the tire width direction of the tire central region within 70% to 90% of the half of the maximum belt width Wb of the belt layer from the tire equatorial plane, a reduction in weight of the tire can be realized. In addition, by increasing the number of stacked layers of the spirally wound belt layers in the region on the outside of 70% to 90% of the half of the maximum belt width Wb of the belt layers from the tire equatorial plane as compared to that in the tire central region, tensile/compressive strain in the tire side part regions of the spirally wound belt layers can be restrained sufficiently, fatigue of the belt cord can be reduced, and durability of the tire as a whole can be enhanced.

Effects of the Invention

The aircraft pneumatic of the present invention makes it possible to realize a reduction in weight of the tire, to reduce fatigue of the belt cord, to realize enhancement of fatigue resistance performance of the belt, and to enhance durability of the tire as a whole.

BRIEF DESCRIPTION OF DRAWINGS

FIG. 9 is a schematic diagram depicting the manner of winding a spirally wound belt layer of an aircraft pneumatic tire of another embodiment of the present invention.

MODES FOR CARRYING OUT THE INVENTION

Figure 1:
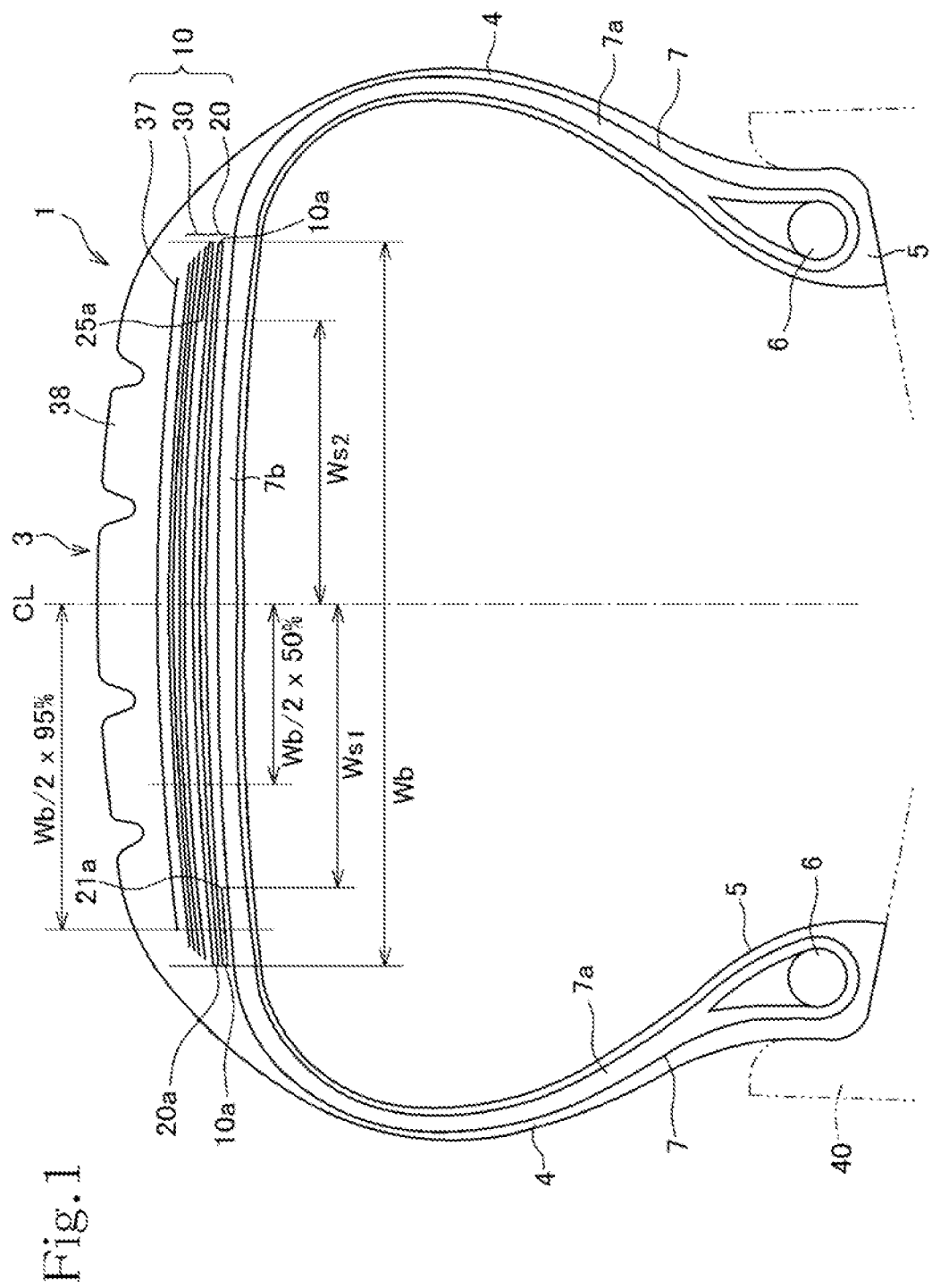
FIG. 1 is a width direction sectional view in a state in which an aircraft pneumatic tire according to a first embodiment of the present invention is assembled in a prescribed rim and provided with a prescribed internal pressure.

A first embodiment of an aircraft pneumatic tire according to the present invention will be described based on FIGS. 1 to 5 and 8. FIG. 1 depicts a sectional view in a tire width direction of an aircraft pneumatic tire 1 (hereinafter referred to as the tire 1) of the first embodiment of the present invention. The tire 1 is assembled on an applied rim 40.

In the figure, symbol CL corresponds to the center in the tire width direction, and indicates a tire equatorial plane which is a plane orthogonal to the tire rotational axis. The tire width direction is a direction parallel to the tire rotational axis, and the tire radial direction is a direction approaching or spacing away from the tire rotational axis, orthogonally to the tire rotational axis.

The tire 1 includes bead sections 5 in which a pair of left and right ring-shaped bead cores 6 are embedded, a radial carcass 7 arranged to extend toroidally between the pair of bead cores 6, belt layers 10 in circumferential contact with the radial direction outside of the radial carcass 7, a tread section 3 having a tread rubber 38 in circumferential contact with an outer circumferential surface of the belt layers 10, and side wall sections 4 covering side parts of the tire 1.

The radial carcass 7 has one or more carcass plies 7a stacked on one another; for example, four to seven carcass plies 7a are stacked, and both end portions thereof are fixed to the periphery of the bead cores 6 by being wound up from the inner side to the outer side of the radial direction. In the tire 1 of the present embodiment, seven carcass plies 7a including nylon cords are stacked.

On the tire radial directional outer side of a crown region 7b of the radial carcass 7, the belt layers 10 are provided. The belt layers 10 include spirally wound belt layers 20 wound around an outer circumferential surface of the radial carcass 7, zigzag belt layers 30 laid on an outer circumference of the spirally wound belt layers 20, and a protective belt layer 37 wound around an outer circumference of the zigzag belt layer. A tread rubber 38 is attached to an outer circumferential surface of the protective belt layer 37, to form a tread section 3. The maximum belt width in the width direction of the belt layers 10 is defined as Wb, and both edges of the belt layers 10 in the width direction are defined as width directional end edges 10a.

Figure 4:
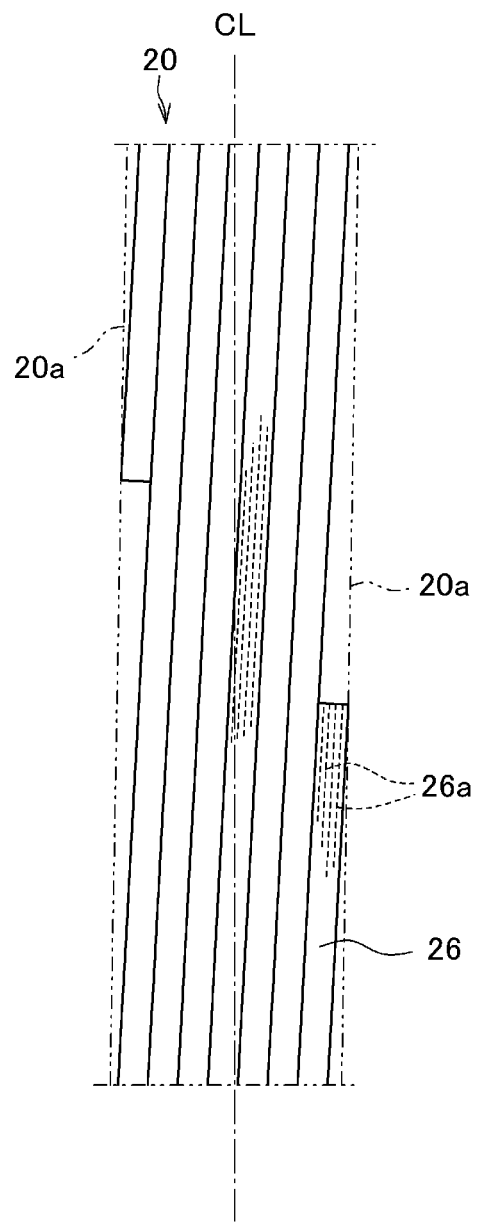
FIG. 4 is a partial development view depicting a formation example of a spirally wound belt layer.
Figure 5:
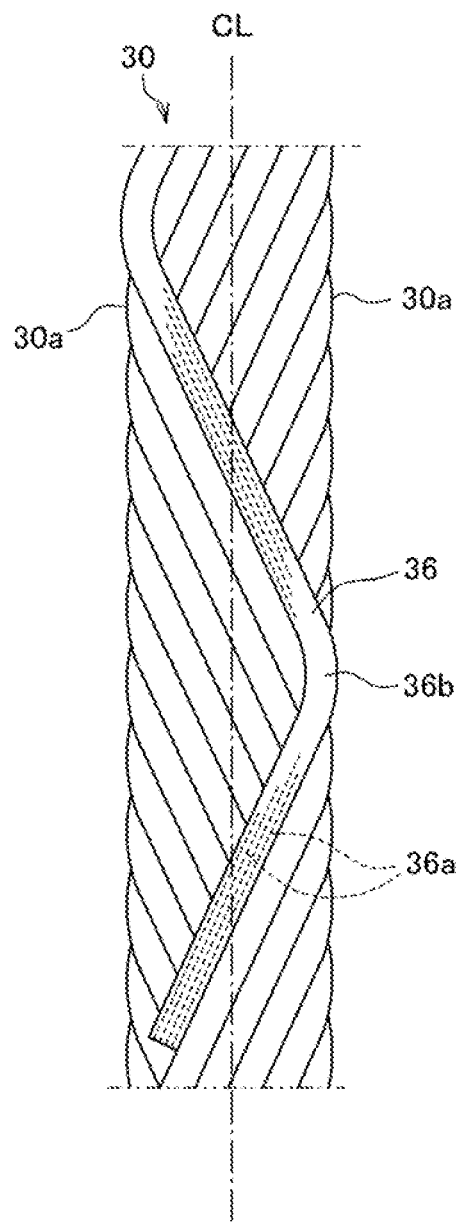
FIG. 5 is a partial development view depicting a formation example of a zigzag belt layer.

As depicted in FIGS. 4 and 5, the spirally wound belt layers 20 and the zigzag belt layers 30 are respectively made of spiral winding strips 26 as ribbon-shaped first strip materials and zigzag winding strips 36 as ribbon-shaped second strip materials, which are wound in a predetermined manner of winding respectively. The spiral winding strips 26 and the zigzag winding strips 36 are one or a plurality of organic fiber-made belt cords 26a and 36a covered with rubber and formed in a ribbon shape with predetermined widths.

As the organic fiber-made belt cords 26a and 36a used for the spiral winding strips 26 and zigzag winding strips 36, in the present embodiment, organic fiber cords of an aromatic polyamide such as aramid are used. Alternatively, hybrid fiber cords produced by combining an aromatic polyamide such as aramid and an aliphatic polyamide such as nylon can also be used.

The hybrid cord of the aliphatic polyamide fiber and the aromatic polyamide fiber may be a twined combination of yarn of an aliphatic polyamide fiber and yarn of an aromatic polyamide fiber or may be twined yarn obtained by twining preliminarily hybridized yarn of an aliphatic polyamide fiber and an aromatic polyamide fiber.

As depicted in FIGS. 1 to 4 and 8, the spirally wound belt layers 20 of the tire 1 of the present embodiment are formed by winding the spiral winding strip 26 in the crown region 7b of the radial carcass 7 of a raw tire, with a predetermined deviation in the tire width circumferential direction, in a helical shape in the tire circumferential direction, in such a manner as not to generate gaps between itself and the adjacent spiral winding strips 26. The spiral winding strips 26 are wound such that the angle of the belt cord 26a thereof has an angle of equal to or less than 5° relative to the tire equatorial plane CL.

When the spiral winding strip 26 starts to be wound in the crown region 7b of the radial carcass 7, the winding is not started from the position of the width directional end edge 10a of the belt layers 10 in the tire width direction, but, as depicted in FIG. 1, the winding is started with a predetermined spacing of Ws1 from the tire equatorial plane CL. For the spirally wound belt layers 20, the position of a width directional end edge 20a is preliminarily determined in the tire width direction, the spirally wound belt layer 20 is gradually wound spirally toward the width directional end edge 20a, and a first layer 21 is provided as an innermost side layer located on the most inner side in the tire radial direction.

Figure 2:
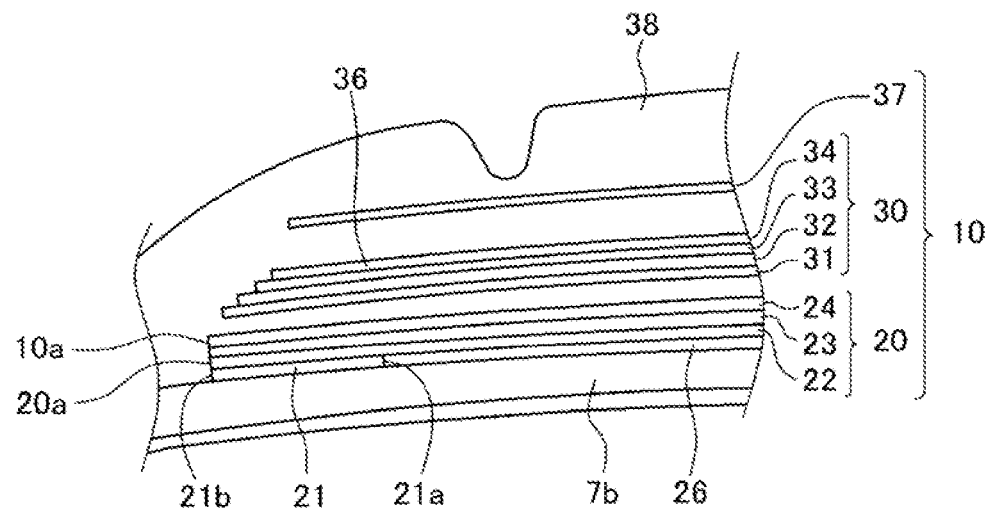
FIG. 2 is a width direction sectional view in which major parts on one side of the aircraft pneumatic tire of FIG. 1 are enlarged.
Figure 3:
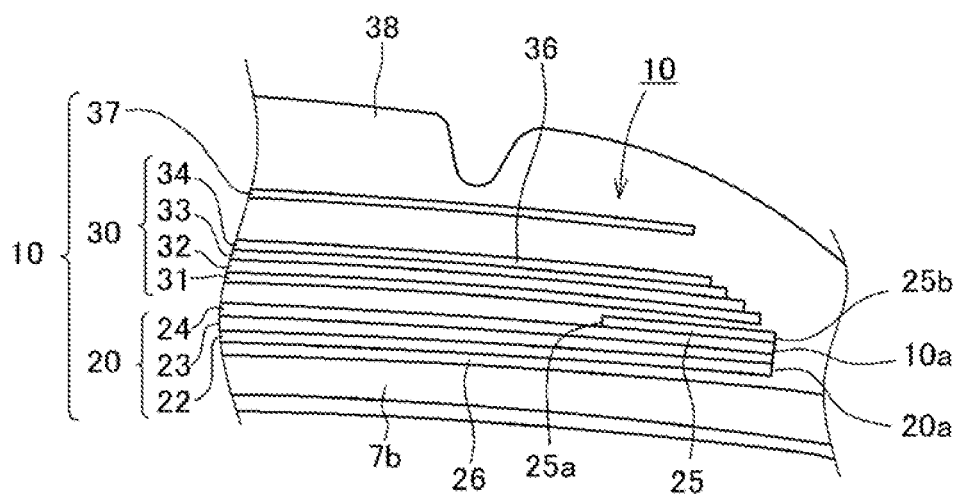
FIG. 3 is a width direction sectional view in which major parts on the other side of the aircraft pneumatic tire of FIG. 1 are enlarged.

As depicted in FIGS. 2 and 4, the spiral winding strip 26 is folded back when wound to the width directional end edge 20a of the spirally wound belt layer 20, starts to be wound around an outer circumferential surface of the first layer 21, is wound toward the width directional end edge 20a on the other side, and is sequentially folded back and stacked, whereby a second layer 22, a third layer 23, a fourth layer 24, and a fifth layer 25 of the spirally wound belt layers 20 are stacked. In the present embodiment, the spirally wound belt layers 20 includes five layers of the first layer 21, the second layer 22, the third layer 23, the fourth layer 24, and the fifth layer 25 from the inside of the tire radial direction. While the spirally wound belt layers 20 have a five-layer structure in the present embodiment, the number of the layers can be modified, as required.

As depicted in FIGS. 1 and 4, at the fifth layer 25 as the outermost side layer located on the most outer side in the tire radial direction, the spiral winding strip 26 is wound toward the tire equatorial plane CL from the width directional end edge 20a on the other side opposite to the one side on which the first layer 21 is provided relative to the tire equatorial plane CL, and the winding is finished at a position with a predetermined spacing $Ws_2$ from the tire equatorial plane CL.

$Ws_1$ and $Ws_2$ are set longer than at least 50% of half the length of the maximum belt width Wb of the belt layers 10. In other words, as depicted in FIG. 1, the first layer 21 and the fifth layer 25 are provided to be located on the width directionally outer side than the half of the width directional end edge 10a of the belt layers 10 from the tire equatorial plane CL.

More preferably, $Ws_1$ and $Ws_2$ are 70% to 90% of half the length of the maximum belt width Wb, and satisfy the relation of $$0.7 \leq Ws_1/(Wb/2) \leq 0.9, \text{ and}$$

$$0.7 \leq Ws_2/(Wb/2) \leq 0.9.$$

In other words, the spiral winding strip 26 is wound, to provide the spirally wound belt layers 20, such that an inner end portion 21a of the first layer 21 and an inner end portion 25a of the fifth layer 25 are located at a position spaced by 70% to 90% of half the length of the maximum belt width Wb from the tire equatorial plane CL.

Since the spirally wound belt layers 20 are produced by winding the spiral winding strip 26 as described above, as depicted in FIGS. 2 and 3, the spirally wound belt layers 20 have four layers in a tire side part region on the width directionally outer side than the inner end portion 21a of the first layer 21 and on the width directionally outer side than the inner end portion 25a of the fifth layer 25, and have three layers in a tire central region between the inner end portion 21a of the first layer 21 and the inner end portion 25a of the fifth layer 25.

With such a configuration, the relation of $$N_{95} > N_{50}$$

is satisfied, where $N_{50}$ is the number of stacked belt layers of the spirally wound belt layers 20 at a distance of 50% of half the length of the maximum belt width Wb of the belt layers 10 from the tire equatorial plane CL, and $N_{95}$ is the number of stacked belt layers of the spirally wound belt layers 20 at a distance of 95% of half the length of the maximum belt width Wb from the tire equatorial plane CL.

Further, the spirally wound belt layers 20 in the present embodiment satisfy the relation of $$N_{95} = N_{50} + 1.$$

The zigzag belt layers 30 are configured by winding, by a predetermined method, a ribbon-shaped zigzag winding strip 36 with a predetermined width that is formed by arranging or aligning one or a plurality of organic fiber-made belt cords 36a and covering them with rubber, as depicted in FIG. 5. As the material of the belt cords 36a, aramid is used. While aramid is used in the present embodiment, the zigzag winding strip 36 extends in the circumferential direction while being folded back at width directional end edges 30a of the predetermined zigzag belt layer 30 and being bent in a zigzag shape, to stack a prescribed plurality of layers; in the present embodiment, four layers are stacked. The zigzag winding strip 36 is wound with deviation by a desired amount in the circumferential direction so as not to generate gaps between itself and the adjacent zigzag winding strips 36.

After the raw tire is produced in such a state that the spirally wound belt layers 20, the zigzag belt layers 30, and the protective belt layer 37 are wound on the circumferential directionally outer side of the crown region 7b of the radial carcass 7 and the tread rubber 38 is wound around the outer circumferential surface thereof in this way, the raw tire is subjected to vulcanization molding, whereby the tire 1 of the present embodiment is obtained.

Since the spirally wound belt layers 20 in the tire 1 of the present embodiment are configured as described above, the number of stacked layers of the spirally wound belt layers 20 can be reduced in a tire central region, to thereby realize a reduction in weight of the tire, and the number of stacked layers of the spirally wound belt layers 20 can be increased in the tire side part regions, to thereby enhance the fatigue resistance performance of the belt cords 26a and to enhance durability of the tire 1.

Further, since $N_{95}$ and $N_{50}$ are set such as to satisfy the relation of $N_{95} = N_{50} + 1$, the spiral winding strip 26 can easily be wound continuously.

In addition, $Ws_1$ and $Ws_2$ are set such as to satisfy the relation of $$0.7 \leq Ws_1/(Wb/2) \leq 0.9, \text{ and}$$

$$0.7 \leq Ws_2/(Wb/2) \leq 0.9.$$

In other words, $Ws_1$ and $Ws_2$ are set to be between 70% and 90% of half the length of the maximum belt width Wb. Since the inner end portion 21a of the first layer 21 and the inner end portion 25a of the fifth layer 25 are located on the outer side of the position of 70% of the half of the maximum belt width Wb from the tire equatorial plane CL, the spirally wound belt layers 20 can be more reduced in weight, and a sufficient reduction in weight of the tire as a whole can be realized. In addition, since the inner end portion 21a of the first layer 21 and the inner end portion 25a of the fifth layer 25 are located on the inner side of the position of 90% of the half of the maximum belt width Wb from the tire equatorial plane CL, the region in which the number of stacked layers of the belt layers 10 is great can be secured sufficiently, a tensile/compressive strain of the tire side part regions of the spirally wound belt layers 20 can be sufficiently restrained, fatigue of the belt cords 26a can be reduced, and durability of the tire 1 as a whole can be enhanced.

EXAMPLES

The manner of winding the spiral winding strip 26 of the spirally wound belt layers 20 in each of various tires is selectively indicated by any of the first, second, third, and fourth manners. The first to fourth manners of winding are schematically depicted respectively in FIGS. 6 to 9. In these winding schematic diagrams, the left-right direction is the tire width direction, and going upward in the figures is going outward in the tire radial direction.

Figure 6:
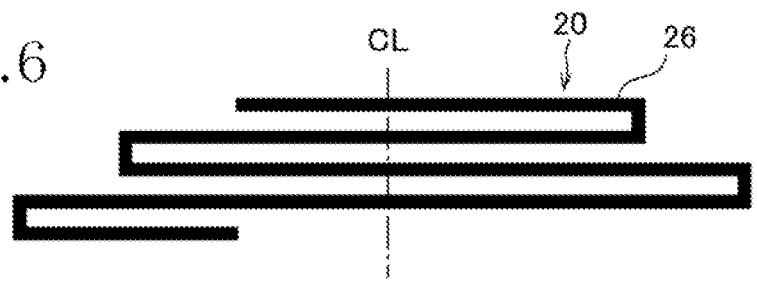
FIG. 6 is a schematic diagram depicting the manner of winding a spirally wound belt layer of an aircraft pneumatic tire of Prior Art Example 1.
Figure 7:
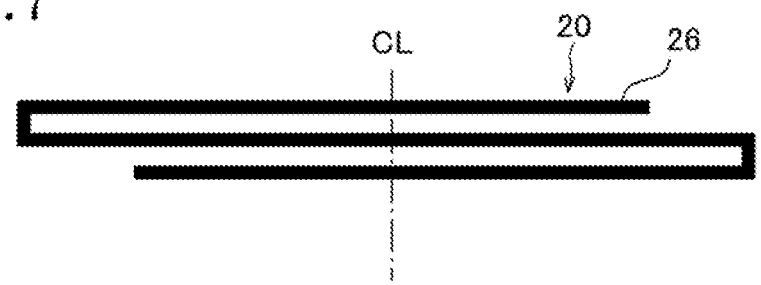
FIG. 7 is a schematic diagram depicting the manner of winding a spirally wound belt layer of an aircraft pneumatic tire of Prior Art Example 2.
Figure 8:
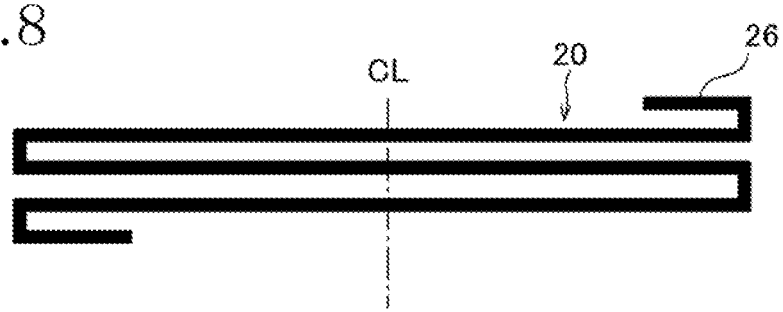
FIG. 8 is a schematic diagram depicting the manner of winding a spirally wound belt layer of an aircraft pneumatic tire of an embodiment of the present invention.

As depicted in FIG. 6, the first manner of winding is a winding such that the number of layers of the spirally wound belt layers 20 gradually increases in going from a side part region toward a central region of the spirally wound belt layers 20. As illustrated in FIG. 7, the second manner of winding is a winding such that the number of layers of the spirally wound belt layers 20 is greater in the tire central region than in the tire side part region. As depicted in FIG. 8, the third manner of winding, which is the manner of winding in the tire 1 of the embodiment of the present invention, is a manner of winding such that the number of layers of the spirally wound belt layers 20 is greater in the tire side part region than in the tire central region. As illustrated in FIG. 9, the fourth manner of winding is a manner of winding such that the spiral winding strip 26 is started to be wound from a position with the distance $Ws_1$ from the tire equatorial plane CL on one side in the tire width direction, as a first layer of the innermost side layers, and is folded back at the width directional end edge 20a of the spirally wound belt layers 20, and a second layer is stacked. Further, at the other side in the tire width direction, the spiral winding strip 26 is folded back after being wound to the width directional end edge 20a of the spirally wound belt layer 20, and a third layer and a fourth layer are folded back without being wound to the tire equatorial plane CL on the other side and are wound again to the width directional end edge 20a and then folded back. Fifth to seventh layers are folded back after being wound to the width directional end edge 20a, and an eighth layer is finished being wound at a position with a distance of $Ws_2$ from the tire equatorial plane CL.

While the embodiment of the present invention has been described above, it is natural that the modes of the present invention are not limited to the abovementioned embodiment, and include the modes carried out in various forms within the scope of the gist of the invention.

REFERENCE SIGNS LIST

1: Aircraft pneumatic tire
3: Tread section
4: Side wall section
5: Bead section 6: Bead core
7: Radial carcass
7a: Carcass ply
7b: Crown region
10: Belt layer
10a: Width directional end edge
20: Spirally wound belt layer
21: First layer
21a: Inner end portion
21b: Outer end portion
22: Second layer
23: Third layer
24: Fourth layer
25: Fifth layer
25a: Inner end portion
25b: Outer end portion
26: Spiral winding strip
26a: Belt cord
30: Zigzag belt layer
31: First layer
32: Second layer
33: Third layer
34: Fourth layer
36: Zigzag winding strip
36a: Belt cord
37: Protective belt layer
38: Tread rubber
40: Applied rim.

The invention claimed is:

1. An aircraft pneumatic tire comprising:
a pair of bead cores (6);
a radial carcass (7) including at least one carcass ply (7a) extending toroidally between both the bead cores (6); and
a belt layer (10) that is disposed on an outer circumferential side of a crown region of the radial carcass (7) and reinforces the radial carcass (7), characterized in that
the belt layer (10) includes
a spirally wound belt layer (20) in which a ribbon-shaped first strip material (26) with a first belt cord (26a) including organic fibers and being covered with rubber has a spirally wound structure, and a prescribed plurality of layers (21, 22, 23, 24, 25) are laid on one another, and
a zigzag belt layer (30) in which a ribbon-shaped second strip material (36) with a second belt cord (36a) including organic fibers and being covered with rubber has a structure of being wound and extending in a circumferential direction while bending zigzag by being folded back at width directional end edges (30a) to an outer circumferential side of the spirally wound belt layer (20),
the first belt cord (26a) of the spirally wound belt layer (20) extends at an angle of equal to or less than 5° relative to a tire equatorial plane (CL),
the second belt cord (36a) of the zigzag belt layer (30) extends at an inclination of an angle of 2° to 45° relative to the tire equatorial plane (CL), to folding back points (36b) where the second belt cord (36a) is folded back at each width directional end edge (30a) of the zigzag belt layer (30), and a relation of $$N_{95} > N_{50}$$

is satisfied,
where $N_{50}$ is the number of stacked belt layers of the spirally wound belt layer (20) at a distance of 50% of half the length of a maximum belt width (Wb) of the belt layers (10) from the tire equatorial plane (CL), and
$N_{95}$ is the number of stacked belt layers of the spirally wound belt layer (20) at a distance of 95% of half the length of the maximum belt width (Wb) from the tire equatorial plane (CL),
an innermost side layer (21) located on a most inner side in a tire radial direction, of the plurality of spirally wound belt layers (20), is disposed on one side of the tire equatorial plane (CL) in a tire width direction,
an inner end portion (21a) on an inner side in the tire width direction, of end portions (21a, 21b) of the innermost side layer (21) in the tire width direction, is located with a predetermined spacing $Ws_1$ from the tire equatorial plane (CL),
an outer end portion (21b) on an outer side in the tire width direction, of the end portions (21a, 21b) of the innermost side layer (21), is located on a tire width directionally outer side than the inner end portion (21a) of the innermost side layer (21),
an outermost side layer (25) located on the most outer side in the tire radial direction, of the plurality of spirally wound belt layers (20), is disposed on said one side relative to the tire equatorial plane (CL) in the tire width direction,
an inner end portion (25a) on an inner side in the tire width direction, of end portions (25a, 25b) of the outermost side layer (25) in the tire width direction, is located with a predetermined spacing $Ws_2$ from the tire equatorial plane (CL),
an outer end portion (25b) on an outer side in the tire width direction, of the end portions (25a, 25b) of the outermost side layer (25), is located on a tire width directionally outer side than the inner end portion (25a) of the outermost side layer (25), and
the plurality of spirally wound belt layers (20) comprises a folded back portion on the outer side in the tire width direction relative to the tire equatorial plane (CL), wherein the plurality of spirally wound belt layers (20) is folded back at a width directional end edge (20a), is folded back without being wound to the tire equatorial plane (CL), and is then folded back again at the width directional end edge (20a).

2. The aircraft pneumatic tire according to claim 1, wherein $N_{95}$ and $N_{50}$ satisfy a relation of $$N_{95} = N_{50} + 1.$$

3. The aircraft pneumatic tire according to claim 1, wherein the maximum belt width (Wb) of the belt layer (10), $Ws_1$, and $Ws_2$ satisfy the relations of $$0.7 \leq Ws_1/(Wb/2) \leq 0.9, \text{ and}$$

$$0.7 \leq Ws_2/(Wb/2) \leq 0.9.$$

* * * * *